April 8, 1969     D. W. BIRDWELL     3,437,110
FLUID PRESSURE RELIEF VALVE
Filed Aug. 16, 1965
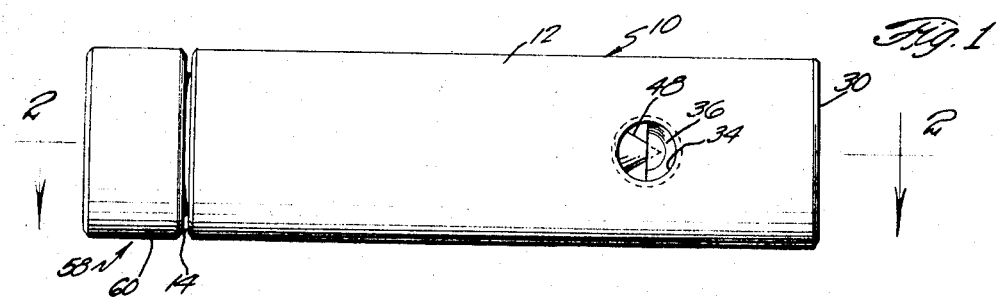
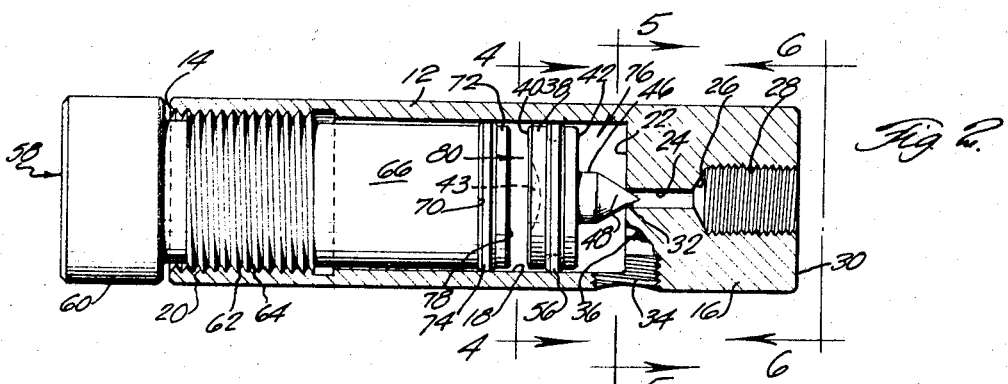
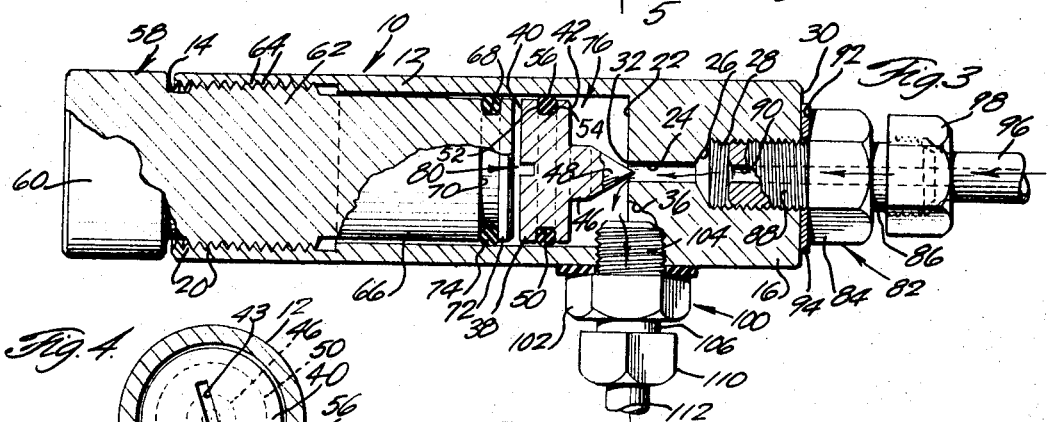
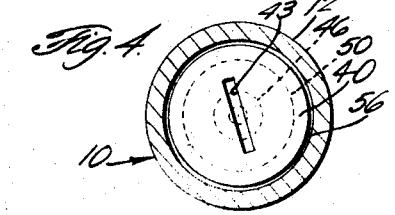
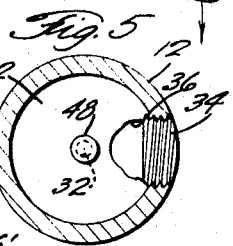
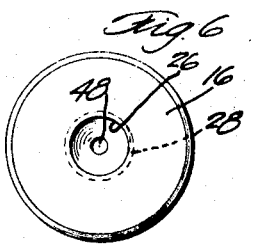
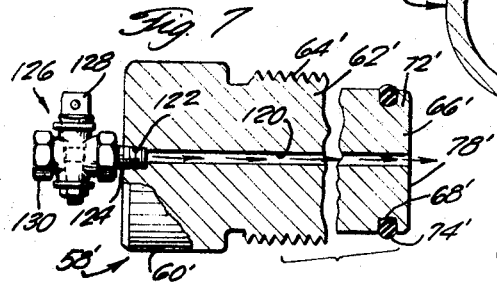
INVENTOR.
DEWIE W. BIRDWELL
BY
Berman, Davidson & Berman
ATTORNEYS

United States Patent Office 3,437,110
Patented Apr. 8, 1969

3,437,110
FLUID PRESSURE RELIEF VALVE
Dewie W. Birdwell, Snyder, Tex., assignor to Citation Manufacturing Company, Inc., Siloam Springs, Ark., a corporation of Arkansas
Filed Aug. 16, 1965, Ser. No. 480,028
Int. Cl. F16k 17/04, 21/04
U.S. Cl. 137—528                                1 Claim

ABSTRACT OF THE DISCLOSURE

A relief valve comprising: a tubular, externally cylindrical shell having a closed end; a pressure channel penetrating said closed end; a valve member mounted as a sealed piston in said tubular shell and having closure means engaging said channel; an adjusting member having threaded engagement with the interior of said tubular member and having an end with sealed piston engagement with the interior of said tubular shell, there being a passage through said adjusting member for the application of predetermined relief resisting pressure to said valve member; means for closing said passage; said adjusting means operating to compensate for pressure losses after closure of said passage.

---

This invention relates to the general field of control means for hydraulic or pneumatic systems and, more specifically, the instant invention pertains to pressure-relief valves therefor.

One of the primary objects of this invention is to provide a fluid-pressure relief valve wherein a valve element is loaded by a fluid, such as a gas, the gas being confined in a sealed chamber.

Another object of this invention is to provide a fluid-pressure relief valve including adjustable loading means for the valve element, the loading means being capable of adjustment by an operator to maintain any one of an infinite number of loading pressures on the valve element.

A further object of this invention is to provide a fluid-pressure relief valve including a valve element wherein the valve element is loaded for movement toward its closed position by the presence of a volume of air or gas confined in a sealed chamber, and wherein means is provided for varying the volumetric capacity of the chamber in order to alter or adjust the pressure loading of the valve element.

This invention also contemplates in a valve of the type generally described supra, the provision of means for introducing air or gas in the loading chamber under pressure together with means to prevent the venting of the high pressure air or gas to the atmosphere.

This invention contemplates, as a still further object thereof, the provision of a fluid-pressure relief valve which is non-complex in construction and assembly, inexpensive to manufacture and maintain, and which is rugged and durable in use.

Other and further objects and advantages of the instant invention will become more manifest from a consideration of the following specification when read in conjunction with the annexed drawing, in which:

FIGURE 1 is a side elevational view of a fluid-pressure relief valve constructed according to this invention;

FIGURE 2 is a longitudinal detail cross-sectional view, FIGURE 2 being taken substantially on the horizontal plane of line 2—2 of FIGURE 1, looking in the direction of the arrows, FIGURE 2 illustrating the adjustment means as being moved to its adjusted position to exert a maximum pressure on a valve piston;

FIGURE 3 is a detail longitudinal cross-sectional view similar to FIGURE 2, FIGURE 3 illustrating the valve piston and valve element as moved to their respective relief positions;

FIGURE 4 is a vertical detail cross-sectional view, FIGURE 4 being taken substantially on the vertical plane of line 4—4 of FIGURE 2, looking in the direction of the arrows;

FIGURE 5 is a vertical detail cross-sectional view, FIGURE 5 being taken substantially on the vertical plane of line 5—5 of FIGURE 2, looking in the direction of the arrows;

FIGURE 6 is an end elevational view of the fluid-pressure relief valve, FIGURE 6 being taken substantially on the vertical plane of line 6—6 of FIGURE 2, looking in the direction of the arrows; and FIGURE 7 is a fragmentary longitudinal detail cross-sectional view of a modified form of the pressure-adustment means.

Referring now more specifically to the drawing, reference numeral 10 designates, in general, a fluid-pressure relief valve constructed in accordance with the teachings of this invention. The valve 10 includes an elongated substantially hollow cylindrical casing 12 having an open end 14 and an opposed end closed by an integrally-formed transversely-extending substantially solid cylindrical closure wall 16 of appreciable axial length relative to the axial length of the casing 12. The wall 16 is disposed coaxially with respect to the casing 12 and the outer cylindrical sides the casing 12 and closure wall 16 are congruent.

The casing 12 is axially-bored inwardly from its open end 14 to provide a smooth internal cylindrical valve guide passage 18. The passage 18 is internally-threaded at 20 adjacent its open end 14, and the inner end of the passage 18 terminates at the planar inner end 22 of the closure wall 16, the plane of the inner end 22 being disposed perpendicular to the longitudinal axis of the casing 12.

An elongated substantially smooth cylindrical bore 24 is formed in the closure wall 16, the bore being coaxial with respect to the casing 12 and has its outer end opening in the planar end 22 of the closure wall 16. The inner end of the bore 24 opens into the inner end of an axially-extending counterbore 26, the counterbore being internally-threaded at 28 and terminating at its outer end into the plane of the outer end 30 of the closure wall 16. As will be seen infra, the inner end of the bore 24 serves as a valve seat 32.

The casing 12 adjacent its connection with the closure wall 16 is internally-bored and tapped as at 34 (see FIGURE 2), with the bore at its inner and continuing into a semi-ogive cavity 36 which opens in the planar inner end 22 of the closure wall 16. As is seen in FIGURE 2, the adjacent ends of the tapped bore 34 and the cavity 36 occupy coincident co-extending areas thereby completely opening the inner end of the tapped bore 34 to the passage 18. As is also seen in FIGURLE 2, the longitudinal axis of the bore 24 is disposed perpendicular to the longitudinal axis of the tapped bore 34.

Reference numeral 38 denotes a substantially solid cylindrical valve piston having an external or outer diameter less than the internal or inner diameter of the passage 18. The piston 38 has a pair of opposed sides 40, 42, the side 40 facing the open end 14 of the casing 12, and the side 42 facing the planar side 22 of the closure wall 16. To serve a function to be described, the side 40 is formed with an inwardly-extending arcuate slot 43, and the opposed side 42 thereof is provided with a coaxial laterally-projecting substantially cylindrical valve stem 46 which terminates in a conical valve element 48 integral therewith. As is seen in FIGURES 2 and 3, the valve stem 46 and its integrally-formed valve element 48 project toward the bore 24 and are coaxial therewith whereby movement of the piston 38 toward the closure wall 16 causes the valve element 48 to seat and seal in the valve seat 32 cutting off its communication with the passage 18, the cavity 36 and its associated tapped bore 34 (see FIGURE 2), and movement of the piston 38 in the opposite direction away from the closure wall 16 unseats the valve element 48 and establishes communication of the bore 24 with the passage 18, the cavity 36 and its associated tapped bore 34 (see FIGURE 3).

The valve piston 38, intermediate its ends, is formed with a circumferential groove 50, the opposed sides of which are bounded by the axially-spaced and parallel abutment shoulders 52, 54. Disposed within the groove 50 is an O-ring seal 56 formed of a plastic material, such as polyurethane. The O-ring seal 56 is sufficiently flexible to cause it to mold itself to the contour of the passage 18 and is, at the same time, sufficiently rigid so as to hold the circumferential side of the piston 38 spaced from the adjacent side of the passage 18 whereby the piston 38 is freely reciprocable within the passage 18, its free reciprocation being restricted only by the component of fraction between the seal 56 and the passage 18.

It is preferred to use polyurethane in the making of the O-ring seal 56 rather than the usual rubber material or nylon, since rubber sealing rings deteriorate rapidly and nylon is not recommended because it is not flexible enough to mold itself to the guide passage 18 and, of course, once it wears, the piston 38 starts leaking. Nylon is too hard to function satisfactorily in the assembly of this invention.

At 58 is designated, in general, an elongated substantially solid cylindrical plug utilized in closing the outer and 14 of the casing 12. As is seen in FIGURES 2 and 3, the plug 58 includes an outer cylindrical handle portion 60 integrally-connected at one of its ends with one end of a central section 62 externally-threaded at 64 for threaded engagement with the internal threads 20 of the casing 12. The other end of the central section 62 continues into an integral connection with one end of an axially-elongated substantially cylindrical rod 66, the rod 66 having a circumferential groove 68 formed therein adjacent the other end thereof, the groove 68 being bounded by the abutment shoulders 70, 72 which serve as stop means for an O-ring seal 74. The O-ring seal 74 is also formed of polyurethane as is the O-ring seal 56, and has its attendant advantages.

The side 42 of the piston 38 and the adjacent end 22 of the closure wall 16, taken together with that portion of the casing 12 extending therebetween, cooperate to form a substantially hollow cylindrical chamber 76, and in a similar manner, the side 40 of the piston 38 and the adjacent end 78 of the rod 66, taken together with that portion of the casing 12 extending therebetween, define a hollow cylindrical chamber 80 (see FIGURES 1 and 2).

In the valve 10 assembled as above-described, after the boring, tapping and threading operations have been made, the piston 38 is now inserted into the bore 18 with the valve element 48 facing the closure wall 16. The valve element is then pushed into the chamber 12 until the valve element 48 seats in the valve seat 32. Plug 58 is then inserted into the passage 18, and in so being inserted, traps air at atmospheric pressure between the end 78, the adjacent side 40 of piston 38, and that portion of the casing 12 which extends therebetween. As the plug 58 is advanced in the passage 18 the atmospheric (low pressure) air trapped between the end 78 and the piston 38 becomes compressed and exerts a higher pressure on the piston 38, causing the valve element 48 to firmly seat in its valve seat under this biasing pressure. This pressure is regulated, of course, by the screwing or unscrewing of the plug 58.

Reference numeral 82 denotes, in general, a conventional fitting device which includes the usual wrench head 84 from the opposite sides of which laterally-project aligned externally-threaded necks 86, 88, respectively. As is seen in FIGURE 2, the fitting device 82 includes a continuous passage 90 that extends longitudinally therethrough. The neck 88 is adapted for threaded connection with the internal threads 28 of the closure wall 16, the fitting 82 being so threaded until the side 92 compresses the annular washed 94 against the adjacent end 30 of the closure wall 16 to effect a liquid-tight seal. A substantially hollow cylindrical conduit 96 is provided at one of its ends with the conventional coupler 98 adapted for connection with the neck 86. The other end of the conduit is adapted for connection in the high-pressure side of a fluid of pneumatic system (not shown).

Reference numeral 100 denotes a second fitting device identical to the fitting device 82. As such, it includes a wrench head 102 from the opposed sides of which laterally-project externally-threaded necks 104, 106, the neck 104 being threaded into the tapped bore 34 and carrying an annular washer 108 interposed between the wrench head 102 and the immediately adjacent side of the casing 12 to provide a fluid-tight seal. The fitting 100 is provided with an elongated axially-extending passage (not shown) similar to the passage 90 that extends therethrough, and the outer end of the neck 106 connects through a conventional coupler 110 with one end of a substantially hollow conduit 112, the other end of the latter being connected with a fluid recirculating or recovery system (not shown). As will become apparent below, the bore may be vented directly to the atmosphere with or without using the fitting 100 and component elements associated therewith if the fluid flowing in the above-referred to system is expendable.

The above-described valve 10 comprises a pressure relief or safety valve which finds utility in substantially any hydraulic or pneumatic system, and while this invention is primarily devised for use in hydraulic systems which are or may be subject to surge pressures, it is useful in any fluid system subject to high pressures which, at times, exceed the predetermined normally required pressure, or in any pneumatic system in which the possibility of excessive pressure in its lines may be anticipated. For example, the valve 10 has been found to be very successful in its application to high-pressure lines on hydraulic car-wash equipment where surge pressures are frequently encountered, but this is but one example of the manifold uses of the valve. The valve 10 could be used, again by way of example, in the hydraulic systems of loading mechanisms or in any installation employing hydraulic or pneumatic-pressure systems.

In operation, with the conduit 96 connected with a working high-fluid pressure which does not normally exceed its optimum maximum pressure, the valve element 48 remains seated in its valve seat 32. However, when the fluid working pressure surges, for any reason, above the desired maximum, the high surge pressure acts against the valve element 48 causing it to unseat from its seat 38 so that the fluid of the system now under surge pressure will discharge from the bore 24 into the chamber 76, and as this action takes place, the piston 38 is moved toward the end 78 of the rod 66 and compresses the low-pressure air trapped in the chamber 80 as the volume of the latter is reduced, and the fluid under surge pressure now fills the chamber 76 for discharge through the tapped bore 34, fitting 100 and into the conduit for recapture or venting to the atmosphere. As the high fluid surge pressure diminishes and the pressure in the conduit 96 returns to its predetermined optimum maximum value, the air trapped in the chamber 80 expands, thereby forcing the piston 38 to move toward the closure wall 16 to effect re-seating of the valve element 48 in its seat 32.

As has been mentioned above, the valve 10 possesses the unique feature in that the released pressure may be varied over wide ranges through the simple expedient of screwing or unscrewing the plug 58 whereby the volume of the chamber 80 containing the entrapped atmospheric air may be varied to vary the biasing pressure on the piston 38. It should also be noted that in the construction and operation of the valve 10, the O-ring seal 56 has a coefficient of friction which may be increased or decreased through a change in material or by widening that area of the seal making contact with the inner side of the casing 12, or by changing the design of the O-ring seal. Since the pressure surge or pressure overage is applied through the bore 24, the piston 38 remains in the position shown in FIGURE 1 with the valve 48 seated. The piston remains in this position until a sufficient amount of pressure is applied to overcome the friction of the O-ring seal 56. With the application of this overage pressure, the piston 38 is driven toward the adjacent end 78 of the rod 66 compressing the captured air, as explained supra, and removing the valve element 48 completely from its valve seat 32. This has the advantage of preventing erosion and wear on the valve element 48 and its seat 32 that other pressure-relief valve mechanisms are subjected to.

The valve 10 is constructed in such a manner as to permit and facilitate its repair and maintenance. For example, if a foreign substance from the working fluid under high pressure entered the bore 24 and became lodged on the valve element 48 causing wear, it is only necessary to remove the plug 58 and piston 38 together with the valve element 48, place some valve grinding compound on the needle valve 48, return the piston 38 to the passage 18 to re-engage the valve element 48 with its seat 32, and thereafter engage a screwdriver blade (not shown) with the slot 43 to rotate and grind the valve element 48 into a new seat. The plug 58 is then again screwed on the casing 12. While the above-described embodiment of this invention employs air entrapped within the passage 18 at atmospheric pressures before the rod 66 is materially advanced in the passage 18, the invention provides for increased air pressure in the chamber 80 by lengthening the chamber or, alternately, providing means for introducing air under pressure into this chamber. This latter embodiment of the invention is illustrated in FIGURE 7 wherein elements of the second embodiment finding counterparts in the first one thereof bear identical reference numerals to which a prime mark has been added.

Thus, and referring specifically to FIGURE 7, the plug 58' is seen to comprise a substantially solid cylindrical handle portion 60' having an end thereof integrally-connected with one end of a cylindrical central section 62' externally-threaded as at 64'. The other end of the central section 62' is integrally-connected with one end of a cylindrical rod 66' having an exposed end 78'. Extending axially of the plug 58' is a bore 120 having an end thereof opening into the end 78', the other end of the bore 120 being counterbored and internally-threaded as at 122 to receive the threaded nipple 124 of a petcock 126 having a valve-operating handle 128 and a coupler 130 for connection with a source of air or other liquid under high pressure. Thus, with the coupler 130 connected to the high-pressure source, and with the valve handle 128 turned to open the valve to admit the high-pressure air to the bore 120, the air passes through the plug 58' and into the chamber 80. When sufficient air under high pressure has been admitted to the chamber 80, the valve handle 128 is turned to close its associated valve and the source of high-pressure air is then disconnected from the coupler 130. The operation of this modified structure of the valve is the same as described above, it being understood, of course, that the petcock 126 is retained in its association with the plug 58' at all times.

Having described and illustrated in detail two embodiments of this invention, it will be understood that the same are offered merely by way of example, and that this invention is to be limited only by the scope of the appended claim.

What is claimed is:

1. A relief valve comprising: a tubular, externally cylindrical shell having a closed end; a pressure channel penetrating said closed end; a valve member mounted as a piston in said tubular shell but having clearance from said shell, said clearance being sealed by an O-ring on said member, said member having closure means engaging said channel; a pressure compensating member having threaded engagement with the interior of said tubular member and having an end extending into but clearing the walls of said shell and bearing an O-ring with sealed slidable engagement with the interior of said tubular shell; a relief vent formed in said shell adjacent said closed end, a passage through said compensating member for the application of predetermined relief resisting pressure to said valve member, and a valve on the outside of said compensating member for closing said passage, said threaded engagement of said compensating member allowing compensation through adjustment of said compensating member for loss of pressure between the valve member and the sealed end of said pressure compensating member after establishment of said predetermined pressure through said passage in said compensating member.

References Cited

UNITED STATES PATENTS

| 1,679,907 | 8/1928 | La Bour | 137—243 |
| 2,179,003 | 11/1939 | Allen | 137—528 X |
| 2,243,711 | 5/1941 | Lamb | 137—538 X |
| 2,925,984 | 2/1960 | Kowalski | 251—26 |
| 3,216,441 | 11/1965 | Thorsheim | 251—57 X |

FOREIGN PATENTS

| 972 | 1865 | Great Britain. |
| 93,880 | 7/1962 | Denmark. |
| 1,083,096 | 6/1960 | Germany. |

ALAN COHAN, *Primary Examiner.*

DENNIS H. LAMBERT, *Assistant Examiner.*

U.S. Cl. X.R.

251—57